(12) United States Patent
Tsuji et al.

(10) Patent No.: US 7,803,889 B2
(45) Date of Patent: Sep. 28, 2010

(54) GRANULATED POWDER OF LOW-MOLECULAR POLYTETRAFLUORO-ETHYLENE AND POWDER OF LOW-MOLECULAR POLYTETRAFLUORO-ETHYLENE AND PROCESSES FOR PRODUCING BOTH

(75) Inventors: Masayuki Tsuji, Settsu (JP); Yasuhiko Sawada, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 907 days.

(21) Appl. No.: 10/547,363

(22) PCT Filed: Mar. 1, 2004

(86) PCT No.: PCT/JP2004/002465

§ 371 (c)(1),
(2), (4) Date: Aug. 29, 2005

(87) PCT Pub. No.: WO2004/076539

PCT Pub. Date: Sep. 10, 2004

(65) Prior Publication Data

US 2006/0252898 A1 Nov. 9, 2006

(30) Foreign Application Priority Data

Feb. 28, 2003 (JP) ............................. 2003-054815
May 16, 2003 (JP) ............................. 2003-139311

(51) Int. Cl.
*C08F 214/18* (2006.01)
(52) U.S. Cl. .................. 526/250; 524/544; 428/402
(58) Field of Classification Search ............... 526/250; 524/544; 428/402
See application file for complete search history.

(56) References Cited

U.S. PATENT DOCUMENTS

| | | | |
|---|---|---|---|
| 3,766,031 A | | 10/1973 | Dillon |
| 4,499,249 A | | 2/1985 | Nakagawa et al. |
| 5,118,788 A | | 6/1992 | Hosokawa et al. |
| 5,603,999 A | * | 2/1997 | Namura et al. ......... 428/36.92 |
| 6,057,393 A | * | 5/2000 | Hirai ........................ 524/414 |
| 6,458,457 B1 | | 10/2002 | Asano et al. |
| 6,747,108 B1 | * | 6/2004 | Hosokawa et al. ......... 526/206 |
| 2002/0183451 A1 | * | 12/2002 | Sukegawa et al. ......... 525/190 |
| 2004/0026805 A1 | * | 2/2004 | Cody et al. ................ 264/15 |

FOREIGN PATENT DOCUMENTS

| | | | |
|---|---|---|---|
| EP | 0 093 404 A2 | | 11/1983 |
| EP | 093404 | * | 11/1983 |
| EP | 93404 A2 | | 11/1983 |
| EP | 0 644 209 B1 | | 3/1995 |
| EP | 844271 | * | 8/1996 |
| EP | 0 808 847 A1 | | 11/1997 |
| EP | 808847 | * | 11/1997 |
| EP | 644209 | * | 6/1998 |
| EP | 1 065 223 A1 | | 1/2001 |
| EP | 1065223 A1 | * | 1/2001 |
| GB | 1428838 | * | 3/1976 |
| JP | 49-39642 | | 4/1974 |
| JP | 49-48671 | | 12/1974 |
| JP | 50-15506 | | 6/1975 |
| JP | 51-41085 | | 4/1976 |
| JP | 52-28552 | | 3/1977 |
| JP | 52-25419 | | 7/1977 |
| JP | 61-118331 | | 6/1986 |
| JP | 61-162503 | | 7/1986 |
| JP | 7-5744 | | 1/1995 |
| JP | 7-165828 | | 6/1995 |
| JP | 10-147617 | | 6/1998 |
| JP | 10-316763 | | 12/1998 |
| JP | 2001-513529 | | 9/2001 |
| WO | WO 99/07674 | | 2/1999 |
| WO | WO-2004/076539 A1 | * | 9/2004 |

\* cited by examiner

*Primary Examiner*—Peter D. Mulcahy
*Assistant Examiner*—Henry Hu
(74) *Attorney, Agent, or Firm*—Sughrue Mion, PLLC

(57) ABSTRACT

This invention provides a granulated powder of low-molecular-weight polytetrafluoroethylene reduced in the possibility of the powder being blown up or adhering to hoppers, a low-molecular-weight polytetrafluoroethylene powder obtainable by suspension polymerization, and methods of producing these. The present invention provides a low-molecular-weight polytetrafluoroethylene-based granulated powder which is obtained by a granulation treatment of a low-molecular-weight polytetrafluoroethylene particle comprising a low-molecular-weight polytetrafluoroethylene having a number average molecular weight of not higher than 600000.

4 Claims, No Drawings

US 7,803,889 B2

GRANULATED POWDER OF LOW-MOLECULAR POLYTETRAFLUORO-ETHYLENE AND POWDER OF LOW-MOLECULAR POLYTETRAFLUORO-ETHYLENE AND PROCESSES FOR PRODUCING BOTH

TECHNICAL FIELD

The invention relates to a low-molecular-weight polytetrafluoroethylene-based granulated powder, a low-molecular-weight powder, and methods of producing these.

BACKGROUND ART

Low-molecular-weight polytetrafluoroethylene species have so far been used, for example, as additives to ink or cosmetic compositions or like other base materials for the purpose of reducing friction and improving slip characteristics on the base material surface or as additives to coating materials for the purpose of improving the surface texture of coatings.

Known as low-molecular-weight polytetrafluoroethylene species are those obtained by emulsion polymerization (cf. e.g. Japanese Kokai Publication S51-41085 and Japanese Kokai Publication H07-165828), those obtained by thermal degradation of high-molecular-weight polytetrafluoroethylene species (cf. e.g. Japanese Kokai Publication S49-39642, Japanese Kokoku Publication (Patent Publication) H07-5744, Japanese Kokoku Publication S50-15506, Japanese Kokai Publication S61-118331 and Japanese Kokai Publication S61-162503), and those obtained by subjecting moldings from high-molecular-weight polytetrafluoroethylene in powder, scrap or other form to irradiation treatment (cf. e.g. Japanese Kokoku Publication S52-25419, Japanese Kokoku Publication S49-48671, Japanese Kohyo Publication 2001-513529 and U.S. Pat. No. 3,766,031).

However, low-molecular-weight polytetrafluoroethylene powders obtained by any of those methods have problems, namely they tend to blow up as fine dust on the occasion of addition to other materials or, when they are electrostatically charged, they readily adhere to the hopper; thus, they are very poor in handleability.

That low-molecular-weight polytetrafluoroethylene powders are composed of very fine particles is also presumable as one of the causes of the problems of powder blowing up and adhesion to hoppers. If the size of the very fine particles is increased in an attempt to solve the above problems, however, there arises another problem, namely the dispersibility thereof on the occasion of admixing with other materials becomes poor.

There are no low-molecular-weight polytetrafluoroethylene powders available in the art that have both the characteristics, good handleability without powders blowing up or adhering to hoppers and good dispersibility as additives.

From the process simplification and molecular weight distribution narrowing viewpoint, those low-molecular-weight polytetrafluoroethylene species which can be directly obtained by polymerization and preferably need no post-treatment step for molecular weight reduction are preferred. As a method by which they can be obtained directly by polymerization, there is known the emulsion polymerization method (cf. e.g. Japanese Kokai Publication H07-165828) but any method involving suspension polymerization is not known.

Further, a powder with a specific surface area of 7 to 20 $m^2/g$ is known as a low-molecular-weight polytetrafluoroethylene species obtained by polymerization (cf. e.g. Japanese Kokai Publication H10-147617). This powder, however, is disadvantageous in that its particles are readily blown up or adhere to hoppers.

Furthermore, recent study results, among others, have revealed a suspected risk of perfluorooctanoic acid [PFOA] to the environment, and the United States Environmental Protection Agency (EPA) announced, on Apr. 14, 2003, that more intensive scientific researches concerning PFOA should be made (cf. e.g. EPA Report "Preliminary Risk Assessment of the Developmental Toxicity Associated with Exposure to Perfluorooctanoic Acid and Its Salts", Internet <URL:http://www.epa.gov/opptintr/pfoa/pfoara.pfd>).

SUMMARY OF THE INVENTION

In view of the above-discussed state of the art, it is an object of the present invention to provide a granulated powder of low-molecular-weight polytetrafluoroethylene reduced in the possibility of the powder being blown up or adhering to hoppers, a low-molecular-weight polytetrafluoroethylene powder obtainable by suspension polymerization, and methods of producing these.

This invention provides a low-molecular-weight polytetrafluoroethylene-based granulated powder which is obtained by a granulation treatment of a low-molecular-weight polytetrafluoroethylene particle comprising a low-molecular-weight polytetrafluoroethylene having a number average molecular weight of not higher than 600000.

This invention provides a method of producing the low-molecular-weight polytetrafluoroethylene-based granulated powder, which comprises producing the above mentioned low-molecular-weight polytetrafluoroethylene-based granulated powder from the low-molecular-weight polytetrafluoroethylene particle by the granulation treatment, said granulation treatment being carried out at a temperature not lower than 80° C. but lower than 100° C. using a low-molecular-weight polytetrafluoroethylene aqueous dispersion comprising said low-molecular-weight polytetrafluoroethylene particle dispersed in an aqueous dispersion medium in the presence of a surfactant.

This invention provides a method of producing the low-molecular-weight polytetrafluoroethylene-based granulated powder, which comprises producing the above mentioned low-molecular-weight polytetrafluoroethylene-based granulated powder from the low-molecular-weight polytetrafluoroethylene particle by the granulation treatment, said granulation treatment being carried out using a low-molecular-weight polytetrafluoroethylene aqueous dispersion comprising said low-molecular-weight polytetrafluoroethylene particle dispersed in an aqueous dispersion medium in the presence or absence of a surfactant, said low-molecular-weight polytetrafluoroethylene aqueous dispersion containing a water-insoluble liquid and said surfactant amounts to not more than 5 parts by mass per 100 parts by mass of said low-molecular-weight polytetrafluoroethylene particle.

This invention provides a low-molecular-weight polytetrafluoroethylene powder which has a melt viscosity not higher than 2500 Pa·s as measured by the flow tester method at 340° C. and is obtained by suspension polymerization.

This invention provides a low-molecular-weight polytetrafluoroethylene powder which has a specific surface area smaller than 7 $m^2/g$ and a melt viscosity not higher than 2500 Pa·s as measured by the flow tester method at 340° C.

This invention provides a method of producing the low-molecular-weight polytetrafluoroethylene powder, which comprises producing the above mentioned low-molecularweight polytetrafluoroethylene powder by suspension polymerization using a chain transfer agent, said chain transfer agent being hydrogen, a lower saturated hydrocarbon or a lower alcohol, said suspension polymerization being carried out at a liquid temperature not lower than 40° C. but lower than 100° C. using a polymerization initiator and said polymerization initiator comprises a persulfate salt or a sulfite salt and an organic peroxide.

This invention provides a method of producing the low-molecular-weight polytetrafluoroethylene powder, which comprises producing the above mentioned low-molecular-weight polytetrafluoroethylene powder by suspension polymerization using a chain transfer agent, said chain transfer agent being hydrogen, a lower saturated hydrocarbon or a lower alcohol, said suspension polymerization being carried out at a liquid temperature of 5 to 40° C. using a polymerization initiator and said polymerization initiator comprising not only a persulfate salt or a sulfite salt and/or an organic peroxide but also a redox catalyst.

This invention provides a low-molecular-weight polytetrafluoroethylene-based gelation product powder which is obtained through heat treatment comprising heating the above mentioned low-molecular-weight polytetrafluoroethylene powder at not lower than 250° C. but lower than 340° C.

DETAILED DISCLOSURE OF THE INVENTION

In the following, the invention is described in detail.

The low-molecular-weight polytetrafluoroethylene-based granulated powder according to the invention (hereinafter referred to as "low-molecular-weight PTFE-based granulated powder") is obtained by granulation treatment of a low-molecular-weight PTFE particle comprising a low-molecular-weight polytetrafluoroethylene species (hereinafter referred to as "low-molecular-weight PTFE").

The above-mentioned low-molecular-weight PTFE has a number average molecular weight of not higher than 600,000. When it is higher than 600,000, fibrillation characteristics manifest themselves, leading to ready aggregation and poor fine dispersibility in certain instances. As for the lower limit to the number average molecular weight of the low-molecular-weight PTFE, a preferred lower limit may be set at 10,000, for instance, provided that the number average molecular weight is within the range mentioned above. When it is lower than 10,000, the volatility at elevated temperatures becomes high, sometimes making the PTFE unsuited for use in heat-resistant coating materials, for example coating materials requiring baking.

The number average molecular weight of the low-molecular-weight PTFE is the value calculated from the melt viscosity obtained by measurement using the flow tester method.

The low-molecular-weight PTFE may be one obtained by the method of polymerization of low-molecular-weight PTFEs, which is to be described later herein, one obtained by thermal degradation of high-molecular-weight polytetrafluoroethylene, or one obtained by subjecting high-molecular-weight polytetrafluoroethylene to irradiation treatment, provided that it has a number average molecular weight of not higher than 600,000.

The low-molecular-weight PTFE comprises a tetrafluoroethylene homopolymer [TFE homopolymer] and/or a modified polytetrafluoroethylene [modified PTFE].

The "TFE homopolymer and/or modified PTFE" so referred to herein includes, within the meaning thereof, one comprising a TFE homopolymer and containing no modified PTFE, one comprising a modified PTFE and containing no TFE homopolymer, and one comprising a TFE homopolymer and a modified PTFE.

The portion "polytetrafluoroethylene (PTFE)" in the above term "low-molecular-weight PTFE" generally and often means the above-mentioned TFE homopolymer. In the present specification, however, as is evident from the above definition "the low-molecular-weight PTFE comprises a TFE homopolymer and/or a modified PTFE", that portion is not used without any intention of restricting the scope of the term to TFE homopolymers but is nothing but a part of the term "low-molecular-weight PTFE" as one of the terms used herein. Thus, the term "low-molecular-weight PTFE" as a whole represents a TFE homopolymer and/or a modified PTFE.

The TFE homopolymer is obtained by polymerizing tetrafluoroethylene [TFE] alone as a monomer.

The modified PTFE mentioned above means a polymer obtained from TFE and a modifier.

The modifier in the above-mentioned modified PTFE is not particularly restricted but may be any of those copolymerizable with TFE, including, for example, perfluoroolefins such as hexafluoropropene [HFP]; chlorofluoroolefins such as chlorotrifluoroethylene [CTFE]; hydrogen-containing fluoroolefins such as trifluoroethylene; and perfluoro vinyl ethers.

The perfluoro vinyl ethers are not particularly restricted but may be, for example, perfluoro unsaturated compounds represented by the general formula (I):

$$CF_2=CF-ORf \qquad (I)$$

wherein Rf represents a perfluoro organic group. The term "perfluoro organic group" as used herein means an organic group resulting from substitution of fluorine atoms for all the hydrogen atoms bound to the carbon atom or atoms contained therein. The perfluoro organic group may contain one or more ether oxygen atoms.

As the perfluoro vinyl ethers, there may be mentioned, for example, perfluoro(alkyl vinyl ether) [PAVE] species in which Rf in the general formula (I) represents a perfluoroalkyl group containing 1 to 10 carbon atoms. Preferably, the perfluoroalkyl group contains 1 to 5 carbon atoms.

As the perfluoroalkyl group in the PAVEs, there may be mentioned, for example, perfluoromethyl, perfluoroethyl, perfluoropropyl, perfluorobutyl, perfluoropentyl and perfluorohexyl. Perfluoropropyl is preferred, however.

The perfluoro vinyl ethers also include, among others, perfluoro(alkoxyalkyl vinyl ether) or perfluoro(alkylpolyoxyalkylene vinyl ether) species in which Rf in the general formula (1) represents a perfluoro(alkoxyalkyl) group containing 4 to 9 carbon atoms, an organic group represented by the formula

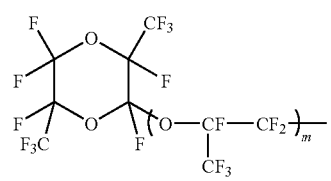

(in which m represents an integer of 1 to 4) or an organic group represented by the formula

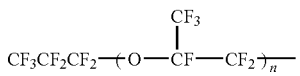

(in which n represents an integer of 1 to 4).

Perfluoro vinyl ethers and chlorotrifluoroethylene are preferred as the modifier in the modified PTFE, and PAVEs are preferred as the perfluoro vinyl ethers.

In the modified PTFE in which such a perfluorovinyl ether as mentioned above, for instance, is used as the modifier, the proportion (% by mass) of the modifier to the sum of the modifier and TFE is, in ordinary cases, preferably not higher than 1% by mass, more preferably 0.001 to 1% by mass.

The modified PTFE may comprise one single species or two or more species differing, for example, in number average molecular weight and/or copolymer composition, and the TFE homopolymer may comprise one single species or two or more species differing in number average molecular weight, for instance.

The method of polymerization of the low-molecular-weight PTFE is not particularly restricted but includes emulsion polymerization and suspension polymerization, among others.

In the polymerization of the low-molecular-weight PTFE, a chain transfer agent may be used. The use of such chain transfer agent makes it possible to adjust the molecular weight of the product low-molecular-weight PTFE and improve the dispersibility as an additive to other materials.

The chain transfer agent is not particularly restricted but may be hydrogen, a lower saturated hydrocarbon or a lower alcohol. The lower saturated hydrocarbon includes, among others, straight or cyclic alkanes containing 1 to 6 carbon atoms, such as methane, ethane, propane, butane, hexane and cyclohexane, and the lower alcohol includes, among others, alcohols containing 1 to 3 carbon atoms, such as methanol and ethanol.

On the occasion of the polymerization of the low-molecular-weight PTFE, an unstable terminal group derived from the chemical structure of the polymerization initiator to be described later herein or the above-mentioned chain transfer agent is formed at one or each molecular chain terminus of the low-molecular-weight PTFE. The unstable terminal group is not particularly restricted but includes, for example, —CH$_2$OH, —COOH and —COOCH$_3$.

The low-molecular-weight PTFE may be one resulting from stabilization of the unstable terminal group. The method of stabilizing the unstable terminal group is not particularly restricted but may comprises, for example, converting the terminus to a trifluoromethyl group [—CF$_3$] by exposure to a fluorine-containing gas.

The low-molecular-weight PTFE may also be one resulting from terminal amidation. The method of such terminal amidation is not particularly restricted but may comprise, for example, bringing the fluorocarbonyl group [—COF] obtained in the above manner by exposure to a fluorine-containing gas into contact with gaseous ammonia, as disclosed in Japanese Kokai Publication H04-20507.

When the low-molecular-weight PTFE is one resulting from the above-mentioned unstable terminal group stabilization or terminal amidation, the low-molecular-weight PTFE-based granulated powder obtained in accordance with the invention or the low-molecular-weight PTFE powder of the invention, which is to be described later herein, can be readily compatible with other materials, such as ink, coating materials or cosmetic compositions, hence can show improved dispersibility therein in cases where it is used as an additive to the other materials.

The low-molecular-weight PTFE particles comprising low-molecular-weight PTFE (hereinafter referred to as "low-molecular-weight PTFE particles") refers herein to particles not yet undergone granulation treatment, as is evident from the fact that the low-molecular-weight PTFE-based granulated powder of the invention is obtained from low-molecular-weight PTFE particles by granulation treatment, as described hereinabove.

The term "low-molecular-weight PTFE particles" as used herein conceptually includes not only those particles in a solid powder but also those particles dispersed, as a dispersoid, in the dispersion obtained by emulsion polymerization, for instance.

The low-molecular-weight polytetrafluoroethylene powder comprising the low-molecular-weight PTFE particles (hereinafter referred to as "low-molecular-weight PTFE powder") is a mass of low-molecular-weight PTFE particles not yet undergone any granulation treatment, as mentioned above and, when the low-molecular-weight PTFE particles are the particles in a solid powder, it is the solid powder itself and, when the low-molecular-weight PTFE particles are the particles dispersed in a dispersion, it is that mass of low-molecular-weight PTFE particles which corresponds to the powder obtained by separating the particles from the dispersion in the conventional manner, for example by flocculation, followed by drying.

The low-molecular-weight PTFE powder preferably has an average grain diameter of 0.5 to 20 μm.

The average grain diameter of the low-molecular-weight PTFE powder as so referred to herein is the value obtained by measuring the grain size distribution of the powder by the laser diffraction grain size distribution measurement method and making a calculation assuming that the average grain size is equal to that grain diameter corresponding to the 50% level of the thus-obtained cumulative grain size distribution.

The low-molecular-weight PTFE-based granulated powder of the invention is obtained from the low-molecular-weight PTFE particles mentioned above by granulation treatment.

It is known in the art that polytetrafluoroethylene species having a number average molecular weight of not higher than 600,000 can hardly fibrillate and, according to a way of thinking, such polymers difficult to fibrillate are difficult to granulate. Thus, no granulation products from low-molecular-weight PTFE particles are known in the art. The present invention has now realized the granulation of low-molecular-weight PTFE particles.

The granulation treatment comprises the step of mixing low-molecular-weight PTFE particles with a filler, surfactant, and/or granulation medium as desired, which is to be described later herein, the step of separating the granulation product obtained from the granulation medium (when used), and the step of drying, if desired. The granulation medium is a medium in the presence of which the low-molecular-weight PTFE particles are subjected to granulation treatment. The granulation medium generally comprises water and/or an organic liquid and is to be selected according to the granulation method employed. The granulation method is not particularly restricted but includes, among others, the underwater granulation, warm or hot water granulation, emulsification/dispersion granulation, emulsification/hot water granulation, solventless granulation and dry solvent granulation methods. It is also possible to employ the granulation methods used in the process for producing low-molecular-weight granulated powders according to the invention, which is to be described later herein, as the underwater granulation, emulsification/hot water granulation and emulsification/dispersion granulation methods.

The underwater granulation method is a method comprising dry mixing the low-molecular-weight PTFE particles with a filler (mentioned later herein), if desired,: adding water, further adding a water-insoluble liquid to the water, stirring the mixture to produce liquid drops and cause the low-molecular-weight PTFE particles to be included in the liquid drops. In the liquid drops, the water-insoluble liquid presumably exists among low-molecular-weight PTFE particle-constituting polymer chains and, when heated, this water-insoluble liquid volatilizes earlier than water, with the result that the polymer chains are aggregated and granulated to form a low-molecular-weight PTFE-based granulated powder. The underwater granulation method does not use any surfactant. Employable as the water-insoluble liquid are the same ones as those which can be used in carrying out the method of producing low-molecular-weight PTFE-based granulated powders according to the invention, which method is to be described later herein.

The warm or hot water granulation method is a method according to which the above underwater granulation method is carried out in a condition such that the temperature of the aqueous dispersion medium is raised to 30 to 100° C., with or without a water-insoluble liquid contained in the mixture. The amount of the water-insoluble liquid should be not larger than 5% by mass relative to the low-molecular-weight PTFE aqueous dispersion.

The emulsification/dispersion granulation method is a method that can also be said to be a method according to which the above-mentioned underwater granulation method is carried out in the presence of a surfactant, namely using a low-molecular-weight PTFE aqueous dispersion resulting from dispersion of low-molecular-weight PTFE particles in an aqueous dispersion medium supplemented with the above-mentioned water-insoluble liquid in the presence of a surfactant.

The emulsification/hot water granulation method according to which the low-molecular-weight PTFE aqueous dispersion resulting from dispersion of low-molecular-weight PTFE particles in an aqueous dispersion medium, with or without addition of the water-insoluble liquid, in the presence of a surfactant is subjected to granulation treatment in a condition such that the aqueous dispersion is heated to a temperature not lower than 80° C. but lower than 100° C.

The grains obtained by the underwater granulation method, the grains obtained by the emulsification/dispersion granulation method and the grains obtained by the emulsification/hot water granulation method are respectively higher in apparent density than the starting low-molecular-weight PTFE particles and, therefore, the powders can be inhibited from being blown up.

The solventless granulation method is a method according to which an aqueous solution of a surfactant is used in lieu of the water and/or organic solvent and this aqueous surfactant solution is admixed with low-molecular-weight PTFE particles.

The dry solvent granulation method is a method using an organic solvent as the granulation medium, without using any surfactant.

The low-molecular-weight PTFE-based granulated powder of the invention as obtained by the above-mentioned granulation treatment preferably has an average grain diameter of 1 to 1500 μm.

Further, the low-molecular-weight PTFE-based granulated powder of the invention is superior in powder flowability as compared with the conventional low-molecular-weight PTFE-based granulated powders, and the powder can be inhibited from adhering to the hopper wall surface and the handleability thereof can be improved.

The low-molecular-weight PTFE-based granulated powder of the invention preferably has an average grain diameter 1 to 400 times the average particle diameter of the low-molecular-weight PTFE powder comprising low-molecular-weight PTFE particles and an apparent density 1.15 to 4 times the apparent density of the low-molecular-weight PTFE powder comprising low-molecular-weight PTFE particles (hereinafter such granulated powder is referred to as "low-molecular-weight PTFE-based granulated powder (P)").

The average grain diameter of the low-molecular-weight PTFE-based granulated powder (P) is at a ratio within the range mentioned above, so that the powder (P) is hardly blown up.

More preferably, the low-molecular-weight PTFE-based granulated powder (P) has an apparent density at least 1.2 times but at most 3 times the apparent density of the low-molecular-weight PTFE powder. The low-molecular-weight PTFE-based granulated powder of the invention can satisfy both the requirement that the apparent density should be 1.15 to 4 times and the requirement that the average grain diameter should be 1 to 400 times.

The low-molecular-weight PTFE-based granulated powder (P) consists of sticky grains and can be inhibited from being blown up or adhering to hoppers and, in addition, is less bulky in transportation and storage, hence the hopper and/or storage tank can be designed to be small. The apparent density so referred to herein is the value obtained by making a measurement according to JIS K 6891.

The low-molecular-weight PTFE-based granulated powder (P) of the invention can be obtained with ease by the method (1) of producing low-molecular-weight PTFE-based granulated powders according to the invention or the method (2) of producing low-molecular-weight PTFE-based granulated powder according to the invention, which is to be described later herein.

In another aspect, the low-molecular-weight PTFE-based granulated powder of the invention preferably has an average grain diameter 1 to 3 times the average particle diameter of the low-molecular-weight PTFE powder comprising low-molecular-weight PTFE particles and an angle of repose at least 1.1 times the angle of repose of the low-molecular-weight PTFE powder comprising low-molecular-weight PTFE particles (such granulated powder is hereinafter referred to as "low-molecular-weight PTFE-based granulated powder (Q)").

The low-molecular-weight PTFE-based granulated powder (Q), which shows an angle of repose ratio within the above range, consists of sticky grains, so that the powder can be prevented from being blown up and the handling thereof in such an operation as charging into a hopper can be facilitated. The angle of repose ratio may be 1.1 to 1.5 times, for instance.

The conventional molding powder granulation products obtained by granulation of molding powders of polytetrafluoroethylene species having a number average molecular weight exceeding 600,000 have an average grain diameter exceeding 3 times, as mentioned hereinabove. On the contrary, the low-molecular-weight PTFE-based granulated powder of the invention can satisfy both the requirement that the angle of repose should be at least 1.1 times that of the low-molecular-weight PTFE powder and the requirement that the average grain diameter should be 1 to 3 times that of the low-molecular-weight PTFE powder.

Further, the low-molecular-weight PTFE-based granulated powder (Q) of the invention preferably has an apparent density ratio of 1.15 to 4 times, like the low-molecular-weight PTFE-based granulated powder (P), in addition to the above-mentioned average grain diameter ratio and angle of repose ratio, as compared with the low-molecular-weight PTFE powder.

The low-molecular-weight PTFE-based granulated powder (Q) of the invention can be obtained with ease by the method (1) of producing low-molecular-weight PTFE-based granulated powders according to the invention, which method is to be described later herein.

In a further aspect, the low-molecular-weight PTFE-based granulated powder of the invention preferably has an average grain diameter 10 to 4.00 times the average particle diameter of the low-molecular-weight PTFE powder comprising low-molecular-weight PTFE particles and an angle of repose not greater than the angle of repose of the low-molecular-weight PTFE powder comprising low-molecular-weight PTFE particles (such granulated powder is hereinafter referred to as "low-molecular-weight PTFE-based granulated powder (R)").

The low-molecular-weight PTFE-based granulated powder (R), which is within the above respective ranges, is hardly blown up and, in addition, is excellent in handleability.

Further, the low-molecular-weight PTFE-based granulated powder (R) of the invention preferably has an apparent density ratio of 1.15 to 4 times, like the low-molecular-weight PTFE-based granulated powder (P), in addition to the above-mentioned average grain diameter ratio and angle of repose ratio, as compared with the low-molecular-weight PTFE powder.

The low-molecular-weight PTFE-based granulated powder (R) of the invention can be obtained with ease by the method (2) of producing low-molecular-weight PTFE-based granulated powders according to the invention, which method is to be described later herein.

The "low-molecular-weight PTFE-based granulated powder", when simply so referred to herein without adding (P), (Q) or (R), includes, within the meaning thereof, the whole of the low-molecular-weight PTFE-based granulated powders including the above-mentioned low-molecular-weight PTFE-based granulated powder (P), low-molecular-weight PTFE-based granulated powder (Q) and low-molecular-weight PTFE-based granulated powder (R) and, further, those low-molecular-weight PTFE-based granulated powders which do not fall under any of the above-mentioned categories, namely low-molecular-weight PTFE-based granulated powder (P), low-molecular-weight PTFE-based granulated powder (Q) and low-molecular-weight PTFE-based granulated powder (R).

In the low-molecular-weight PTFE-based granulated powder of the invention, as for the low-molecular-weight PTFE powder comprising low-molecular-weight PTFE particles, the low-molecular-weight PTFE powder may be one having a specific surface area smaller than 7 m$^2$/g and a melt viscosity of not higher than 2500 Pa·s as measured by the flow tester method at 340° C. The melt viscosity may be lower than 1000 Pa·s. That low-molecular-weight PTFE powder which has a specific surface area and a melt viscosity within the respective ranges mentioned above is hereinafter referred to as "low-molecular-weight PTFE powder (A)".

The low-molecular-weight PTFE powder (A) has a relatively small specific surface area, so that the blowing up of the powder and the adhesion thereof to hoppers can be reduced. A preferred upper limit to the specific surface area of the low-molecular-weight PTFE powder (A) is 6 m$^2$/g, a more preferred upper limit thereto is 5 m$^2$/g, and a preferred lower limit is 1 m$^2$/g and a more preferred lower limit is 2 m$^2$/g.

The specific surface area so referred to herein refers to the value obtained by making a measurement according to the BET method using a surface analyzer.

Since the melt viscosity at 340° C. of the low-molecular-weight PTFE powder (A) is within the above range, the number average molecular weight of the low-molecular-weight PTFE is approximately 100000 or below. The number average molecular weight may be not higher than 40000, for instance.

The melt viscosity so referred to herein refers to the value obtained by making a measurement by the flow tester method at 340° C. according to ASTM D 1238.

The low-molecular-weight PTFE powder (A) is preferably one having a melt viscosity within the above range and a specific surface area within the above range and obtained by suspension polymerization.

The low-molecular-weight PTFE-based granulated powder (P) of the invention, the low-molecular-weight PTFE-based granulated powder (Q) of the invention and the low-molecular-weight PTFE-based granulated powder (R) of the invention, each described hereinabove, can also be obtained by using the low-molecular-weight PTFE powder (A).

The "low-molecular-weight PTFE powder", when simply so referred to herein without adding (A) or (B) (which is to be mentioned later herein), includes, within the meaning thereof, the whole of the low-molecular-weight PTFE powders among which the above-mentioned low-molecular-weight PTFE powder (A) and the low-molecular-weight PTFE powder (B) to be described later herein are included, without making any distinction among the low-molecular-weight PTFE powder (A) and low-molecular-weight PTFE powder (B) and low-molecular-weight PTFE powders other than these.

The method (1) of producing low-molecular-weight PTFE-based granulated powders according to the invention comprises producing the above-mentioned low-molecular-weight PTFE-based granulated powders from low-molecular-weight PTFE particles by granulation treatment, and the granulation treatment is carried out at a temperature of not lower than 80° C. but lower than 100° C. using a low-molecular-weight polytetrafluoroethylene aqueous dispersion (hereinafter referred to as "low-molecular-weight PTFE aqueous dispersion (a)") resulting from dispersion of the low-molecular-weight PTFE particles in an aqueous dispersion medium in the presence of a surfactant.

The method (1) of producing low-molecular-weight PTFE-based granulated powders according to the invention can readily produce the low-molecular-weight PTFE-based granulated powder (P) of the invention and the low-molecular-weight PTFE-based granulated powder (Q) of the invention among the low-molecular-weight PTFE-based granulated powders described hereinabove.

The method of granulation treatment in the method (1) of producing low-molecular-weight PTFE-based granulated powders is sometimes referred to herein as "emulsification/warm or hot water granulation".

The aqueous dispersion medium in the low-molecular-weight PTFE aqueous dispersion (a) is water or a solution of a water-soluble organic solvent in water and serves as a dispersion medium capable of dispersing the low-molecularweight PTFE particles in the presence of a surfactant. The aqueous dispersion medium may contain an additive or additives generally used in granulation methods using water. In cases where the low-molecular-weight PTFE particles constitute a dispersoid dispersed in the dispersion obtained by emulsion polymerization, for instance, the aqueous dispersion medium in the dispersion as such may also be used as the aqueous dispersion medium in question.

The above-mentioned low-molecular-weight PTFE aqueous dispersion (a), which is a dispersion comprising the low-molecular-weight PTFE particles dispersed in an aqueous dispersion medium in the presence of a surfactant, may further contain a water-insoluble liquid.

The low-molecular-weight PTFE aqueous dispersion (a) either contains a water-insoluble liquid or does not contain any water-insoluble liquid, and the content of the water-insoluble liquid is preferably not higher than 5% by mass relative to the low-molecular-weight PTFE aqueous dispersion. When it is higher than 5% by mass, it tends to become difficult to produce the low-molecular-weight PTFE-based granulated powder (P) of the invention or the low-molecular-weight PTFE-based granulated powder (Q) of the invention. Preferably, the low-molecular-weight PTFE aqueous dispersion is substantially free of any water-insoluble liquid, more preferably quite free of any water-insoluble liquid.

The low-molecular-weight PTFE aqueous dispersion (a) may contain a water-insoluble liquid if the water-insoluble liquid can swell the low-molecular-weight PTFE particles but preferably is one free of any water-insoluble liquid.

The water-insoluble liquid is not particularly restricted but may be any of those which occur as liquids at ordinary temperature, namely at about 30° C. and are insoluble in water. As examples thereof which enable the production of the low-molecular-weight PTFE-based granulated powder (P) of the invention or the low-molecular-weight PTFE-based granulated powder (Q) of the invention within the above content range, there may be mentioned, among others, hydrocarbons such as n-hexane, cyclohexane and heptane; halogenated hydrocarbons such as dichloromethane, dichloroethane and chloroform; nitrogen-containing liquids such as N-methylpyrrolidone; esters such as ethyl acetate; and carbonate esters such as diethylene carbonate. Preferred as the water-insoluble liquid are halogenated hydrocarbons and, among them, dichloromethane is more preferred.

The surfactant to be used in carrying out the method (1) of producing low-molecular-weight PTFE-based granulated powders according to the invention is not particularly restricted but preferably is a nonionic surfactant, more preferably a polyoxyethylenepolyoxypropylene glycol [PPG] type surfactant.

The PPG type surfactant is preferably one having an average molecular weight of 1000 to 20000. The surfactant is used preferably in an amount of not smaller than 0.001% by mass, more preferably not larger than 0.5% by mass, still more preferably not larger than 0.1% by mass but within the above range.

According to the method (1) of producing low-molecular-weight PTFE-based granulated powders according to the invention, the granulation is carried out while stirring the low-molecular-weight PTFE aqueous dispersion (a), and the rate of stirring and other conditions can be appropriately selected. In carrying out the method (1) of producing low-molecular-weight PTFE-based granulated powders according to the invention, the temperature of the low-molecular-weight PTFE aqueous dispersion (a) is preferably lower than 100° C. when the low-molecular-weight PTFE aqueous dispersion (a) does not contain any water-insoluble liquid. A more preferred lower limit is 85° C.

The method (2) of producing low-molecular-weight PTFE-based granulated powders according to the invention is a method of producing low-molecular-weight PTFE-based granulated powders which comprises producing the low-molecular-weight PTFE-based granulated powders from low-molecular-weight PTFE particles by granulation treatment, and the granulation treatment is carried out using an low-molecular-weight polytetrafluoroethylene aqueous dispersion (hereinafter referred to as "low-molecular-weight PTFE aqueous dispersion (b)") resulting from dispersion of the low-molecular-weight PTFE particles in an aqueous dispersion medium in the presence or absence of a surfactant and the low-molecular-weight PTFE aqueous dispersion (b) contains a water-insoluble liquid. The content of the surfactant is not higher than 5 parts by mass per 100 parts by mass of the low-molecular-weight PTFE particles.

The method (2) of producing low-molecular-weight PTFE-based granulated powders according to the invention can readily produce the low-molecular-weight PTFE-based granulated powder (P) of the invention and the low-molecular-weight PTFE-based granulated powder (R) of the invention among the low-molecular-weight PTFE-based granulated powders described hereinabove.

The aqueous dispersion medium in the low-molecular-weight PTFE aqueous dispersion (b) is water or a solution of a water-soluble organic solvent in water and serves as a dispersion medium capable of dispersing the low-molecular-weight PTFE particles in the presence or absence of a surfactant. The aqueous dispersion medium may contain an additive or additives generally used in granulation methods using water. The aqueous dispersion medium may be the same one as described hereinabove referring to the low-molecular-weight PTFE aqueous dispersion (a).

The low-molecular-weight PTFE aqueous dispersion (b) contains a water-insoluble liquid.

The content of the water-insoluble liquid is preferably not lower than 5% by mass of the low-molecular-weight PTFE aqueous dispersion (b). When it is lower than 5% by mass, it tends to become difficult to produce the low-molecular-weight PTFE-based granulated powder (P) of the invention or the low-molecular-weight PTFE-based granulated powder (R) of the invention.

As the water-insoluble liquid, there may be mentioned the same ones as described hereinabove referring to the low-molecular-weight PTFE aqueous dispersion (a).

As the granulation treatment in the case of the low-molecular-weight PTFE aqueous dispersion (b) containing no surfactant, there may be mentioned the underwater granulation method described hereinabove and, as the granulation treatment in the case of the low-molecular-weight PTFE aqueous dispersion (b) containing a surfactant, there may be mentioned the emulsification/dispersion granulation method described hereinabove.

The surfactant to be used in carrying out the method (2) of producing low-molecular-weight PTFE-based granulated powders according to the invention is not particularly restricted but includes, for example, those given hereinabove referring to the low-molecular-weight PTFE aqueous dispersion (a).

When the emulsification/dispersion granulation method, for instance, is carried out in the presence of a surfactant, the surfactant is used in an amount of 0.001 to 0.5 part by weight per 100 parts by weight of the low-molecular-weight PTFE particles. A more preferred lower limit is 0.005 part by mass, and a more preferred upper limit is 0.1 part by mass.

In carrying out the method (2) of producing low-molecular-weight PTFE-based granulated powders according to the invention, the water-insoluble liquid and surfactant are as described hereinabove, and the proportion of the low-molecular-weight PTFE particles in the low-molecular-weight PTFE aqueous dispersion (b) and other conditions, except for the granulation temperature, are the same as described above referring to the method (1) of producing low-molecular-weight PTFE-based granulated powders according to the invention and can be appropriately selected.

In carrying out the method (2) of producing low-molecular-weight PTFE-based granulated powders according to the invention, the low-molecular-weight PTFE aqueous dispersion (b) may not be heated and the temperature is preferably not higher than T° C. The term "T° C." as used herein means the temperature at which the rate of evaporation of the water-insoluble liquid heated suddenly increases.

The low-molecular-weight PTFE-based granulated powders obtained by the method (2) of producing low-molecular-weight PTFE-based granulated powders according to the invention have a relatively large average grain diameter and a small angle of repose and, therefore, are superior in that they are hardly blown up and, in addition, their handleability is good.

The low-molecular-weight PTFE-based granulated powders obtained by the method (2) of producing low-molecular-weight PTFE-based granulated powders according to the invention will not allow the particles thereof to be blown up and, therefore, other products occurring in such an environment that the low-molecular-weight PTFE-based granulated powders are handled can be prevented from being adulterated or contaminated with the powders. The adhesion of the powders to hoppers is slight and the powders are excellent in handleability. At the same time, the low-molecular-weight PTFE-based granulated powders obtained by the method (2) of producing low-molecular-weight PTFE-based granulated powders according to the invention can be prevented from being blown up, making it possible to preserve a good working environment.

Even if each grain of the granulated powder is formed as a result of aggregation of a plurality of particles, which are elementary units constituting the granulated powder, the low-molecular-weight PTFE-based granulated powder of the invention is readily disintegrated into the particles before granulation on the occasion of admixing, as an additive to base materials, with such other base materials as engineering plastics in various mixers, hence can be said to be excellent in dispersibility in and miscibility with the base materials. The low-molecular-weight PTFE-based granulated powder of the invention shows equally excellent dispersibility in and miscibility also on the occasion of feeding to a single-screw extruder together with polybutylene terephthalate [PBT] and glass fiber, as disclosed in Japanese Kokai Publication S59-140253, or in the case of addition on the occasion of feeding to an extruder, as disclosed in Japanese Kokai Publication S60-223852.

Those molding powder-based granulation products which are obtained by subjecting molding powders of polytetrafluoroethylene species having a number average molecular weight exceeding 600000 to the same granulation treatment as the granulation treatment for obtaining the low-molecular-weight PTFE-based granulated powder of the invention hardly disintegrate into the particles before granulation even in the step of admixing with resins or other materials.

The low-molecular-weight PTFE powder (B) of the invention has a melt viscosity of not higher than 2500 Pa·s as measured by making a measurement at 340° C. by the flow tester method.

The low-molecular-weight PTFE powder (B) of the invention can be used as the low-molecular-weight PTFE powder comprising low-molecular-weight PTFE particles in the low-molecular-weight PTFE-based granulated powder of the invention and further can be used as the low-molecular-weight PTFE powder comprising low-molecular-weight PTFE particles in the method of producing low-molecular-weight PTFE-based granulated powders according to the invention, as described hereinabove, hence, as is evident from the facts mentioned above, it is included among those low-molecular-weight PTFE powders. Among the above-mentioned low-molecular-weight PTFE powders, it has a melt viscosity within the range given above. Preferably, the melt viscosity of the low-molecular-weight PTFE powder (B) of the invention is not higher than 2000 Pa·s.

The low-molecular-weight PTFE powder (B) of the invention can be readily obtained by suspension polymerization. The method of producing low-molecular-weight PTFE powders according to the invention, which method is to be described later herein, is preferably used as the suspension polymerization for obtaining the low-molecular-weight PTFE powder (B) of the invention.

The low-molecular-weight PTFE powder (B) of the invention has a melt viscosity within the above range and, in addition, preferably has a specific surface area of smaller than 7 $m^2/g$. A more preferred upper limit to the low-molecular-weight PTFE powder (B) of the invention is 6 $m^2/g$, a still more preferred upper limit is 5 $m^2/g$, and a more preferred lower limit is 1 $m^2/g$ and a still more preferred lower limit is 2 $m^2/g$.

The low-molecular-weight PTFE powder (B) of the invention is preferably one having a melt viscosity within the above range and a specific surface area within the same range as given for the low-molecular-weight PTFE powder (A) as obtained by suspension polymerization. Low-molecular-weight PTFE powders having a melt viscosity within the above range and a specific surface area within the above range can be easily obtained by producing the same using the suspension polymerization technique.

The method of producing low-molecular-weight polytetrafluoroethylene powders according to the invention (hereinafter referred to as "method of producing low-molecular-weight PTFE powders") comprises producing the above-mentioned low-molecular-weight PTFE powders by suspension polymerization using a chain transfer agent.

The method of producing low-molecular-weight PTFE powders according to the invention employs suspension polymerization and is superior in that coagulation is not required as compared with the case of production by emulsion polymerization. The method of producing low-molecular-weight PTFE powders according to the invention is suited for use not only in producing the low-molecular-weight PTFE powder (B) but also in producing the low-molecular-weight PTFE powder (A) mentioned hereinabove.

The chain transfer agent is the same one as described hereinabove referring to the production of low-molecular-weight polytetrafluoroethylene by polymerization mentioned hereinabove.

The chain transfer agent is used preferably in an amount of 0.01 to 0.5 mole percent relative to the gaseous phase at the start of polymerization.

When the suspension polymerization is carried out at a liquid temperature of not lower than 40° C. but lower than 100° C., the polymerization initiator to be used includes persulfate salts or sulfite salts, and organic peroxides.

When, assuming that the "persulfate salts and sulfite salts" are referred to as "group a" and the "organic peroxides" as "group b", at least one member is selected from each of group a and group b for use as the polymerization initiator, another reagent having polymerization initiating activity may also be used. The persulfate and sulfite salts have a short half-life and act as polymerization initiators from the beginning of polymerization whereas the organic peroxides are relatively long in half-life and begin to act as polymerization initiators more slowly than the persulfate salts and sulfite salts. Therefore, the combined use of both can render the molecular weight distribution narrower and sharper.

The persulfate salts are not particularly restricted but include, among others, ammonium persulfate and potassium persulfate. The sulfite salts are not particularly restricted, either, but include, among others, ammonium sulfite and potassium sulfite. The organic peroxides are not particularly restricted but include, among others, benzoyl peroxide, disuccinoyl peroxide and diglutaroyl peroxide.

Besides the above-mentioned polymerization initiators, a redox catalyst, which is to be mentioned later herein, may also be used.

The "liquid temperature" mentioned above is the temperature of the polymerization reaction mixture in liquid form.

When the suspension polymerization is carried out at a liquid temperature of 5 to 40° C., the polymerization initiator to be used comprises not only a persulfate salt or sulfite salt and/or an organic peroxide but also a redox catalyst. When it comprises a redox catalyst, the reaction can be allowed to proceed even at such a low temperature of 5 to 40° C.

The above-mentioned combination "not only a persulfate salt or sulfite salt and/or an organic peroxide but also a redox catalyst" may be any of the five combinations: persulfate salt and redox catalyst, sulfite salt and redox catalyst, organic peroxide and redox catalyst, persulfate salt and organic peroxide and redox catalyst, and sulfite salt and organic peroxide and redox catalyst.

The persulfate salt, sulfite salt, organic peroxide and redox catalyst each may comprise two or more species.

Useful as the persulfate salt, sulfite salt and organic peroxide are those mentioned hereinabove.

The redox catalyst is not particularly restricted but includes, for example, a metal carbonyl-carbon tetrachloride mixture and a peroxide-iron(II) compound mixture, among others.

The low-molecular-weight polytetrafluoroethylene-based gelation product powder (hereinafter referred to as "low-molecular-weight PTFE gelation product powder") of the invention is one obtained upon heat treatment of the above-mentioned low-molecular-weight PTFE powder at a temperature not lower than 250° C. but lower than 340° C.

In the above heat treatment, a preferred lower limit to the temperature is 300° C., and a preferred upper limit to the temperature is the melting point of the low-molecular-weight PTFE, for example 330° C.

The low-molecular-weight PTFE gelation product powder and low-molecular-weight PTFE-based granulated powder gelation product each may be either in a "complete gelation product" state after complete gelation of all particles of the low-molecular-weight PTFE powder or all particles of the low-molecular-weight PTFE-based granulated powder, or in a "semi-gelation product" state after gelation of part of particles and/or partial gelation of particles.

The above heat treatment results in mutual fusion bonding, through point contacting, of particles/grains of the low-molecular-weight PTFE powder or low-molecular-weight PTFE-based granulated powder to form masses resulting from binding up generally by weak bonding strength.

The above heat treatment also results in increases in momentum of polymer chains in individual particles/grains of the low-molecular-weight PTFE powder or low-molecular-weight PTFE-based granulated powder, hence in mutual entanglement of the polymer chains; as a result, there is a tendency for the respective particles/grains to become smaller in size and take a compact structure, namely to shrink. The respective grains obtained by the above heat treatment are generally higher in apparent density than the low-molecular-weight PTFE powder or low-molecular-weight PTFE-based granulated powder, which is the powder before heat treatment, and therefore are more resistant to being blown up and more improved in powder flowability, hence in their behavior in feeding to hoppers.

The lumpy product obtained by the above heat treatment may be subjected to grinding treatment to attain a desired size. The grinding treatment is preferably carried out in a manner such that the product may be disintegrated into the respective grains of the low-molecular-weight PTFE gelation product powder or low-molecular-weight PTFE-based granulated powder-derived gelation product powder.

An additive can also be prepared which comprises the low-molecular-weight PTFE-based granulated powder, low-molecular-weight PTFE-based granulated powder gelation product, low-molecular-weight PTFE powder or low-molecular-weight PTFE gelation product powder.

The additive may be the low-molecular-weight PTFE-based granulated powder itself, the low-molecular-weight PTFE-based granulated powder gelation product itself, the low-molecular-weight PTFE powder itself or the low-molecular-weight PTFE gelation product powder itself, or may be a composite additive with a wax or the like added thereto. The composite additive supplemented with a wax is used in the field of inks, for instance.

The above additive is incorporated in various other base materials according to the intended purpose. As the other base materials, there may be mentioned engineering plastics such as polyoxybenzoyl polyesters, polyimides, polyamides, polyamideimides, polyacetals, polycarbonates and polyphenylene sulfide, and other molding materials; inks; and coating materials, among others.

The use of the above additive is not particularly restricted but the additive may be used, for example, for the purpose of improving the nonstickiness and sliding characteristics of copying rolls; and improving the slip characteristics of inks, varnishes, paints and other coating materials as well as cosmetics such as foundations. Further, it is suited for use in those fields in which engineering plastics moldings, such as furniture surface layer sheets, automobile dashboards and domestic electric appliances coverings, should be improved in texture, or machine parts generating mechanical friction, for example light load bearings, gears, cams, touch-tone phone buttons, projectors, camera parts and sliding members, should be improved in slip characteristics and/or wear resistance, or waxes and the like should be improved in oil repellency or water repellency, for instance, or for use as processing aids for engineering plastics.

The above-mentioned low-molecular-weight PTFE-based granulated powder, low-molecular-weight PTFE-based granulated powder gelation product, low-molecular-weight PTFE powder, or low-molecular-weight PTFE gelation product powder can also be used as a molding material for obtaining molded articles. The molded articles may contain a filler and/or an oil. The filler is not particularly restricted but includes, among others, engineering plastics such as polyoxybenzoyl polyesters, polyimides, polyamides, polyamide-imides, polyacetals, polycarbonates and polyphenylene sulfide; carbon fibers; glass fibers; bronze powders; graphite powders; calcium carbonate; calcium sulfate; molybdenum disulfide; silicate minerals such as chlorite, talc and mica; metal oxides; fine powders of soft metals, etc.

BEST MODES FOR CARRYING OUT THE INVENTION

The following examples illustrate the present invention in further detail. These examples are, however, by no means limitative of the scope of the invention.

[Low-molecular-weight PTFE Powder Polymerization]

POLYMERIZATION EXAMPLE 1

A 150-liter stainless steel polymerization vessel equipped with a cone type agitating element was charged with 70 L of deionized water and then tightly closed. After evacuation of the vessel, 100 g of ethane was charged. The TFE monomer was then charged until the vessel inside pressure arrived at 0.5 MPa, and the whole charge was heated to 85° C. After arrival of the vessel inside temperature at 85° C., the TFE monomer was again added to adjust the pressure to 0.8 MPa. Upon addition of 250 ppm/$H_2O$ of ammonium persulfate and 250 ppm/$H_2O$ of disuccinoyl peroxide each as a polymerization initiator in an aqueous solution form, the consumption of the TFE monomer in the vessel started immediately. During polymerization, each time the consumption resulted in a drop in vessel inside pressure to 0.7 MPa, TFE was additionally fed to raise the pressure to 0.85 MPa. After repetitions of this procedure, when the feed of TFE amounted to 12 kg, the polymerization reaction was discontinued, and the vessel inside pressure was released to ordinary pressure. After the start of the polymerization reaction, the vessel inside temperature was always maintained at 84.5 to 85.5° C. After cooling the vessel inside to room temperature, the particles obtained were washed with deionized water, then filtered off and dried at 170° C. in a hot air circulation type drier for 12 hours to give a low-molecular-weight PTFE powder.

POLYMERIZATION EXAMPLE 2

A low-molecular-weight PTFE powder was obtained in the same manner as in Polymerization Example 1 except that the amount of ethane charged was 140 g.

POLYMERIZATION EXAMPLE 3

A low-molecular-weight PTFE powder was obtained in the same manner as in Polymerization Example 1 except that the amount of ethane charged was 160 g.

POLYMERIZATION EXAMPLE 4

A low-molecular-weight PTFE powder was obtained in the same manner as in Polymerization Example 1 except that the amount of ethane charged was 200 g.

POLYMERIZATION EXAMPLE 5

A low-molecular-weight PTFE powder was obtained in the same manner as in Polymerization Example 1 except that the amount of ethane charged was 60 g.

POLYMERIZATION EXAMPLE 6

A low-molecular-weight PTFE powder was obtained in the same manner as in Polymerization Example 1 except that the amount of ethane charged was 75 g.

The low-molecular-weight PTFE powders obtained were evaluated for the following physical characteristics.

Apparent Density

Measurements were made according to JIS K 6891-5.3.

Average Particle Size

Using a laser diffraction type particle size distribution analyzer (product of Nippon Denshi (JEOL)) and using no cascade, particle size distributions were measured at a pressure of 0.1 MPa for a measurement time of 3 seconds. For each powder, the average particle size was regarded as equal to the particle size corresponding to the 50% level of the cumulative particle size distribution.

High Temperature Volatility

Each sample (10 g; A grams in the formula given below) was placed in an aluminum cup (capacity 50 ml, upper diameter 61 mm, lower diameter 42 mm, depth 33 mm), the whole was maintained at 300±2° C. in a nitrogen atmosphere in a hot air circulation type electric oven adjusted in advance to the heating temperature for 1 hour and, thereafter, the mass of the sample was measured. The high temperature volatility was calculated according to the formula:

High temperature volatility (% by mass)=[{$A$−mass after heat treatment (g)}×100]/$A$ Melt Viscosity A 2-g portion of each sample heated beforehand at a temperature of 340° C. for 5 minutes was subjected to measurement at 340° C. under a load of 0.7 MPa using a flow tester (product of Shimadzu Corp.) with a 2ø-8L die.

Specific Surface Area

Measurements were made by the BET method using a surface analyzer (trademark: Monosorb, product of Quantachrome). The carrier gas used was a mixed gas composed of 30% of nitrogen and 70% of helium, and liquid nitrogen was used for cooling.

The results of the above tests are shown in Table 1.

TABLE 1

|  | Chain transfer agent (ethane) Addition level (g) | Apparent density (g/cm$^3$) | Average particle size (μm) | High temperature volatility (%) | Melt viscosity (Pa · s) (340° C.) | Specific surface area (m$^2$/g) |
| --- | --- | --- | --- | --- | --- | --- |
| Polymerization Example 1 | 100 | 0.35 | 12.4 | 0.223 | 1292 | 3.8 |
| Polymerization Example 2 | 140 | 0.28 | 4.2 | 0.456 | 790 | 3.5 |
| Polymerization Example 3 | 160 | 0.30 | 4.2 | 0.421 | 242 | 3.5 |

TABLE 1-continued

| | Chain transfer agent (ethane) Addition level (g) | Apparent density (g/cm³) | Average particle size (μm) | High temperature volatility (%) | Melt viscosity (Pa · s) (340° C.) | Specific surface area (m²/g) |
|---|---|---|---|---|---|---|
| Polymerization Example 4 | 200 | 0.29 | 3.8 | 0.309 | 80 | 2.8 |
| Polymerization Example 5 | 60 | 0.44 | 15.4 | 0.333 | 2424 | 4.2 |
| Polymerization Example 6 | 75 | 0.39 | 14.8 | 0.284 | 1768 | 4.2 |

From Table 1, it was revealed that an increased level of addition of the chain transfer agent ethane results in a reduced melt viscosity.

[Granulation Treatment of Low-Molecular-Weight PTFE Powders]

EXAMPLE 1

Production of a Low-Molecular-Weight PTFE-Based Granulated Powder by the Underwater Granulation Method A 15-L stirring vessel equipped with a cone blade was charged with 6.0 kg of deionized water, and the temperature was adjusted in advance to 20 to 22° C. (step I). Then, the stirring vessel was charged with 500 g of a low-molecular-weight PTFE powder (apparent density 0.28 g/cm³, average particle size 3.1 μm, high temperature volatility 0.21% by mass, angle of repose 42.1 degrees), and stirring was effected by rotating the cone blade at 800 to 900 rpm (step II). After 1 minute of stirring, 200 ml of dichloromethane was added slowly (step III). After the subsequent 10 minutes of stirring, the liquid and the solid matter were separated from each other using a 200-mesh sieve (step IV). The solid matter filtered off was dried in a hot air drying oven at 170° C. for 24 hours and then cooled to room temperature to give a low-molecular-weight PTFE-based granulated powder (step V).

The low-molecular-weight PTFE-based granulated powder obtained was tested for the above-mentioned apparent density and high temperature volatility and evaluated for the following physical characteristics:

Average Grain Diameter

The average grain diameter (100 μm or larger) of a powder was measured in accordance with ASTM D 4894 by the same method as described in International Publication WO 99/12996, page 12, line 6 from bottom to page 13, line 7 from top.

The average diameter smaller than 100 μm of a powder was measured according to the method described above for the polymerization examples.

Angle of Repose

Measurements were made using a powder tester (trademark: PN-R, product of Hosokawa Micron Corp.) according to the angle of repose measurement method specified for that tester.

EXAMPLES 2 TO 5

Production of Low-Molecular-Weight PTFE-Based Granulated Powders by the Underwater Granulation Method Low-molecular-weight PTFE-based granulated powders were obtained in the same manner as in Example 1 except that the amount of dichloromethane charged in step III was 300, 400, 450 or 500 ml, respectively.

EXAMPLE 6

Production of a Low-Molecular-Weight PTFE-Based Granulated Powder by the Underwater Granulation Method A low-molecular-weight PTFE-based granulated powder was obtained in the same manner as in Example 3 except that the stirring in step IV in Example 1 was carried out for 30 minutes.

EXAMPLE 7

Production of a Low-Molecular-Weight PTFE-Based Granulated Powder by the Underwater Granulation Method A low-molecular-weight PTFE-based granulated powder was obtained in the same manner as in Example 3 except that, in step IV in Example 1, the temperature of the stirring vessel was raised to 33° C. over 15 minutes and then the stirring was carried out for 25 minutes.

COMPARATIVE EXAMPLE 1

Production of a Low-Molecular-Weight PTFE-Based Granulated Powder by the Underwater Granulation Method A low-molecular-weight PTFE-based granulated powder was obtained in the same manner as in Example 3 except that, in step IV in Example 1, the temperature of the stirring vessel was raised to 36° C. over 15 minutes and then the stirring was carried out for 10 minutes.

EXAMPLE 8

Production of a Low-Molecular-Weight PTFE-Based Granulated Powder by the Emulsification/Dispersion Granulation Method A low-molecular-weight PTFE-based granulated powder was obtained in the same manner as in Example 3 except that, in step III in Example 1, a specific surfactant was added in an amount of 0.025% by mass relative to the low-molecular-weight PTFE prior to the charging of 400 ml of dichloromethane. Here and hereinafter, the "specific surfactant" means polyoxyethylenepolyoxypropylene glycol type nonionic surfactant (trademark: Pronon #104, Product of Nippon Yushi (NOFCO); average molecular weight 1670).

EXAMPLE 9

Production of a Low-Molecular-Weight PTFE-Based Granulated Powder by the Emulsification/Dispersion Granulation Method A low-molecular-weight PTFE-based granulated powder was obtained in the same manner as in Example 3 except that the above specific surfactant was added in an amount of 0.010% by mass relative to the low-molecular-weight PTFE.

EXAMPLE 10

Production of a Low-Molecular-Weight PTFE-Based Granulated Powder by the Emulsification/Dispersion Granulation Method A low-molecular-weight PTFE-based granulated powder was obtained in the same manner as in Example 3 except that the above specific surfactant was added in an amount of 0.005% by mass relative to the low-molecular-weight PTFE.

EXAMPLE 11

Production of a Low-Molecular-Weight PTFE-Based Granulated Powder by the Emulsification/Hot Water Granulation Method A 15-L stirring vessel equipped with a cone blade was charged with 6.0 kg of deionized water, and the temperature was adjusted in advance to 20 to 22° C. (step 1). Then, the stirring vessel was charged with 500 g of the same low-molecular-weight PTFE as used in Example 1, and stirring was effected by rotating the cone blade at 1000 rpm (step 2). After 1 minute of stirring, the specific surfactant mentioned above was added in an amount of 0.025% by mass relative to the low-molecular-weight PTFE (step 3). The vessel inside temperature was raised to 95° C. with stirring (step 4). After the subsequent 10 minutes of stirring at 95° C., the liquid and the solid matter were separated from each other using a 200-mesh sieve (step 5). The solid matter filtered off was dried in a hot air drying oven at 170° C. for 24 hours (step 6). The dried solid matter was cooled to room temperature to give a low-molecular-weight PTFE-based granulated powder (step 7).

EXAMPLE 12 TO 14

Production of Low-Molecular-Weight PTFE-Based Granulated Powders by the Emulsification/Hot Water Granulation Method Low-molecular-weight PTFE-based granulated powders were obtained in the same manner as in Example 11 except that, in step 3, the specific surfactant was charged in the respective amounts specified in Table 2.

COMPARATIVE EXAMPLES 1 TO 6

Commercial low-molecular-weight PTFE powders (un-granulated ones) were subjected to physical characteristics evaluation in the same manner as in Example 1.

The results obtained in the above manner are shown in Table 2. In the table, #104 denotes the above-mentioned polyoxyethylenepolyoxypropylene glycol type nonionic surfactant (Pronon #104).

TABLE 2

| | Apparent density (g/cm$^3$) | Average particle size (μm) | Angle of repose (degrees) | High temperature volatility (%) | Granulation method | Surfactant Species | Surfactant Mass %/ polymer | Water-insoluble liquid Species | Water-insoluble liquid Addition level (ml) | Temperature raising | Stirring period (min.) |
|---|---|---|---|---|---|---|---|---|---|---|---|
| Starting PTFE | 0.280 | 3.1 | 42.1 | 0.21 | — | — | — | — | — | — | — |
| Example 1 | 0.401 | 185 | 48.0 | 0.23 | Underwater granulation | — | — | CH$_2$Cl$_2$ | 200 | None | 10 |
| Example 2 | 0.570 | 247 | 37.6 | 0.21 | | — | — | CH$_2$Cl$_2$ | 300 | None | 10 |
| Example 3 | 0.620 | 530 | 34.2 | 0.24 | | — | — | CH$_2$Cl$_2$ | 400 | None | 10 |
| Example 4 | 0.600 | 664 | 35.3 | 0.28 | | — | — | CH$_2$Cl$_2$ | 450 | None | 10 |
| Example 5 | 0.600 | 912 | 34.8 | 0.30 | | — | — | CH$_2$Cl$_2$ | 500 | None | 10 |
| Example 6 | 0.684 | 761 | 38.1 | 0.22 | | — | — | CH$_2$Cl$_2$ | 400 | None | 30 |
| Example 7 | 0.639 | 569 | 38.6 | 0.24 | | — | — | CH$_2$Cl$_2$ | 400 | 33° C. | 25 |
| Compar. Ex. 1 | 0.304 | 5 | 44.1 | 0.30 | Underwater granulation | — | — | CH$_2$Cl$_2$ | 400 | 36° C. | 10 |
| Example 8 | 0.594 | 357 | 37.5 | 0.44 | Emulsification/ dispersion granulation | #104 | 0.025 | CH$_2$Cl$_2$ | 400 | None | 10 |
| Example 9 | 0.590 | 446 | 36.0 | 0.40 | | | 0.010 | CH$_2$Cl$_2$ | 400 | None | 10 |
| Example 10 | 0.607 | 442 | 35.0 | 0.39 | | | 0.005 | CH$_2$Cl$_2$ | 400 | None | 10 |
| Example 11 | 0.324 | 4.2 | 49.0 | 0.14 | Emulsification/ hot water granulation | #104 | 0.025 | — | — | 95° C. | 10 |
| Example 12 | 0.328 | 3.6 | 53.4 | 0.29 | | | 2.5 | — | — | 95° C. | 10 |
| Example 13 | 0.530 | 4.2 | 50.1 | 0.12 | | | 0.250 | — | — | 95° C. | 10 |
| Example 14 | 0.390 | 3.8 | 49.6 | 0.11 | | | 0.100 | — | — | 95° C. | 10 |
| Compar. Ex. 1 | 0.340 | 3.3 | 46.2 | 0.12 | Not granulated | | | | | | |
| Compar. Ex. 2 | 0.380 | 5.0 | 47.4 | 0.07 | | | | | | | |
| Compar. Ex. 3 | 0.400 | 4.7 | 46.5 | 0.08 | | | | | | | |
| Compar. Ex. 4 | 0.490 | 7.4 | 42.8 | 0.03 | | | | | | | |
| Compar. Ex. 5 | 0.460 | 7.6 | 54.3 | 0.34 | | | | | | | |
| Compar. Ex. 6 | 0.420 | 12.4 | — | 0.28 | | | | | | | |

From Table 2, it was revealed that the low-molecular-weight PTFE-based granulated powders obtained in Examples 11 to 14 by the emulsification/hot water granulation method were 1.15 to 1.35 times greater in average grain size, 1.15 to 1.9 times higher in apparent density and 1.1 to 1.3 times greater in angle of repose as compared with the starting PTFE.

[Gelation of a Low-Molecular-Weight PTFE Powder]

GELATION EXAMPLE 1

The dried low-molecular-weight PTFE powder obtained in Polymerization Example 2 was spread on a stainless steel tray so that the thickness might not exceed 20 mm. The tray was placed in a hot air circulation type electric oven heated in advance to 250° C. and the powder was heat treated for 30 minutes. After the lapse of 30 minutes, the tray was immediately taken out and allowed to cool to room temperature. A low-molecular-weight PTFE gelation product powder was thus obtained.

GELATION EXAMPLE 2

A low-molecular-weight PTFE gelation product powder was obtained in the same manner as in Gelation Example 1 except that the temperature in the hot air circulation type electric oven was 300° C.

GELATION EXAMPLE 3

A low-molecular-weight PTFE gelation product powder was obtained in the same manner as in Gelation Example 1 except that the temperature in the hot air circulation type electric oven was 320° C.

GELATION EXAMPLE 4

A low-molecular-weight PTFE gelation product powder was obtained in the same manner as in Gelation Example 1 except that the temperature in the hot air circulation type electric oven was 330° C.

COMPARATIVE GELATION EXAMPLE 1

A low-molecular-weight PTFE gelation product powder was obtained in the same manner as in Gelation Example 1 except that the temperature in the hot air circulation type electric oven was 340° C.

COMPARATIVE GELATION EXAMPLE 2

A low-molecular-weight PTFE gelation product powder was obtained in the same manner as in Gelation Example 1 except that the temperature in the hot air circulation type electric oven was 200° C.

The low-molecular-weight PTFE gelation product powders obtained were subjected to the above-mentioned apparent density, average grain diameter and melt viscosity measurements and further to the following physical characteristics measurements.

Heat of Fusion

Melting peak area measurements were carried out using a differential scanning calorimeter (trademark: DSC-50, product of Shimadzu Corp.).

Sensory Testing of Powders for the Tendency Toward Being Blown Up

A macroscopic evaluation was made according to the following criteria:

⊚—No blowing up observed.

○—Almost no blowing up observed.

Δ—A slight extent of blowing up observed.

X—Large amount blowing up observed.

The results obtained in the above manner are shown in Table 3.

TABLE 3

| | Heating temperature (° C.) | Apparent density (g/cm³) | Average particle size (μm) | Melt viscosity (Pa·s) (340° C.) | Heat of fusion (mJ/g) | Sensory testing for powder blowing up |
| --- | --- | --- | --- | --- | --- | --- |
| Gelation Example 1 | 250 | 0.35 | 4.2 | 690 | 71 | ○ |
| Gelation Example 2 | 300 | 0.41 | 5.0 | 670 | 74 | ⊚ |
| Gelation Example 3 | 320 | 0.42 | 5.4 | 710 | 76 | ⊚ |
| Gelation Example 4 | 330 | 0.55 | 8.2 | 694 | 68 | ⊚ |
| Comparative Gelation Example 1 | 340 | | | Fusion bonding of particles | | |
| Comparative Gelation Example 2 | 200 | 0.30 | 3.6 | 790 | 73 | x |

From Table 3, it was revealed that, in the gelation examples, a higher gelation temperature results in a higher apparent density and a greater average grain diameter, hence in a greater extent of inhibition of blowing up.

INDUSTRIAL APPLICABILITY

The method of producing low-molecular-weight PTFE powders according to the invention, which has the constitution described above, can give low-molecular-weight PTFE powders reduced in tendency toward being blown up and improved in handleability.

The invention claimed is:

1. A low-molecular-weight polytetrafluoroethylene-based granulated powder
    which is obtained by a granulation treatment of a low-molecular-weight polytetrafluoroethylene particle consisting essentially of a low-molecular-weight polytetrafluoroethylene having a number average molecular weight of not higher than 600000,
    which granulated powder has an apparent density of not less than 0.401 g/cm$^3$ and an average grain diameter of not less than 185 μm.

2. The low-molecular-weight polytetrafluoroethylene-based granulated powder according to claim 1,
    wherein the average grain diameter of said low molecular-weight polytetrafluoroethylene-based granulated powder is 1 to 400 times the average particle diameter of a low-molecular-weight polytetrafluoroethylene powder comprising the low-molecular-weight polytetrafluoroethylene particle and
    the apparent density of said low molecular-weight polytetrafluoroethylene-based granulated powder is 1.15 to 4 times the apparent density of said low-molecular-weight polytetrafluoroethylene powder comprising said low-molecular-weight polytetrafluoroethylene particle.

3. The low-molecular-weight polytetrafluoroethylene-based granulated powder according to claim 1,
    wherein the average grain diameter of said low molecular-weight polytetrafluoroethylene-based granulated powder is 10 to 400 times the average particle diameter of a low-molecular-weight polytetrafluoroethylene powder comprising the low-molecular-weight polytetrafluoroethylene particle and
    the angle of repose of said low molecular-weight polytetrafluoroethylene-based granulated powder is less than 1 time the angle of repose of said low-molecular-weight polytetrafluoroethylene powder comprising said low-molecular-weight polytetrafluoroethylene particle.

4. The low-molecular-weight polytetrafluoroethylene-based granulated powder according to claim 1,
    wherein, as for a low-molecular-weight polytetrafluoroethylene powder comprising the low-molecular-weight polytetrafluoroethylene particle, said low-molecular-weight polytetrafluoroethylene powder has:
    (i) a specific surface area smaller than 7 m$^2$/g and
    (ii) a melt viscosity not higher than 2500 Pa·s as measured by the flow tester method at 340° C.

* * * * *